US006772494B2

(12) United States Patent
Darling

(10) Patent No.: US 6,772,494 B2
(45) Date of Patent: Aug. 10, 2004

(54) OIL SEAL REMOVER

(76) Inventor: Arthur B. Darling, 162 Highland St., Middleboro, MA (US) 02346

( * ) Notice: Subject to any disclaimer, the term of this patent is extended or adjusted under 35 U.S.C. 154(b) by 169 days.

(21) Appl. No.: 10/053,675

(22) Filed: Jan. 24, 2002

(65) Prior Publication Data

US 2003/0135969 A1 Jul. 24, 2003

(51) Int. Cl.[7] ................................................ B23P 19/02
(52) U.S. Cl. ........................................... 29/235; 29/255
(58) Field of Search .......................... 29/254, 255, 275, 29/235; 173/90, 91; 81/463, 20, 26, 27

(56) References Cited

U.S. PATENT DOCUMENTS 1,536,553 A * 5/1925 Anderson .................... 29/255
1,597,159 A * 8/1926 Johnson et al. ............... 29/254
2,380,068 A 7/1945 Patton
3,529,497 A 9/1970 Brooks
5,245,737 A * 9/1993 Perea .......................... 29/254
5,251,368 A 10/1993 Somerville et al.
5,504,982 A * 4/1996 Sharp .......................... 29/255
5,848,460 A 12/1998 Rasmussen et al.

* cited by examiner

*Primary Examiner*—Robert C. Watson
(74) *Attorney, Agent, or Firm*—Richard C. Litman

(57) ABSTRACT

A sliding hammer type seal puller for removing oil seals from vehicle drive line components. The device comprises a sliding hammer mounted on a steel rod. A handle is mounted at one end of the rod, followed by an impact collar for engagement with the sliding hammer. The other end is flared with a 90-degree bend at the extreme end. In use, the angled end of the seal puller is inserted into the space created between the shaft and the oil seal after the removal of a drive shaft yoke. The angled end of the device is then maneuvered to engage the inside diameter of the seal. Pulling the sliding hammer backwards unseats the seal, which is then easily disengaged and removed from the housing of the drive line assembly component.

5 Claims, 4 Drawing Sheets

OIL SEAL REMOVER

BACKGROUND OF THE INVENTION

1. Field of the Invention

The present invention relates to seal pullers. More particularly, the present invention relates to sliding hammer type devices for removing oil seals from vehicle drive line components.

2. Description of the Related Art

Seal pullers are widely used to service vehicle drive line components. Many seal applications require a special tool for a specific model of a vehicle, particularly in the case of transmissions. Present seal pullers using sliding hammers tend to be complicated in design and thus are expensive and limited in the range of seal sizes and installations they can service. It would be desirable to provide a simple and effective seal puller design which may be used to pull oil seals in a large variety of applications while avoiding damaging the seal housing during the seal pulling process.

U.S. Pat. No. 5,848,460, issued Dec. 15, 1998, to Rasmussen et al., describes a bearing puller having an elongate bolt or rod portion along which a load sleeve is slidingly engaged. An eccentric protrusion is formed at one end for engaging blind press fit bearings for removal.

U.S. Pat. No. 2,380,068, issued Jul. 10, 1945, to Patton describes an oil seal puller having an expansible grip at one end of a shaft which may be expanded to grip the oil seal. Two collars are placed on the shaft between which a hammer slides to assist in the removal of the seal.

U.S. Pat. No. 3,529,497, issued Sep. 22, 1970, to Brooks describes a dowel removing tool having a sliding hammer, a rigid and elongate guide portion, and a tapered impact assembly member.

U.S. Pat. No. 5,251,368, issued Oct. 12, 1993, to Somerville et al. describes a sliding hammer seal puller having an intricate expandable seal engaging element.

None of the above inventions and patents, taken either singularly or in combination, is seen to describe the instant invention as claimed. Thus, an oil seal remover solving the aforementioned problems is desired.

SUMMARY OF THE INVENTION

The present invention is a sliding hammer type seal puller for removing oil seals from vehicle drive line components. The device comprises a sliding hammer mounted on a steel rod. A handle is mounted at one end of the rod, followed by an impact collar for engagement with the sliding hammer. The other end is flared with a 90-degree bend at the extreme end. In use, the angled end of the seal puller is inserted into the space created between the shaft and the oil seal after the removal of a drive shaft yoke. The angled end of the device is then maneuvered to engage the inside diameter of the seal. Pulling the sliding hammer backwards unseats the seal, which is then easily disengaged and removed from the housing of the drive line assembly component.

Accordingly, it is a principal object of the invention to provide a vehicle drive line oil seal puller which is useful for a large variety of oil seal applications.

It is another object of the invention to provide an oil seal puller as above which may easily be operated by a single mechanic.

It is a further object of the invention to provide an oil seal puller as above which is simple in design.

Still another object of the invention is to provide an oil seal puller as above which avoids damage to the seal housing during the pulling operation.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a sliding hammer type seal puller for removing oil seals from vehicle drive line components. The device comprises a sliding hammer mounted on a steel rod. A handle is mounted at one end of the rod, followed by an impact collar for engagement with the sliding hammer. The other end is flared with a 90-degree bend at the extreme end. In use, the angled end of the seal puller is inserted into the space created between the shaft and the oil seal after the removal of a drive shaft yoke. The angled end of the device is then maneuvered to engage the inside diameter of the seal. Pulling the sliding hammer backwards unseats the seal, which is then easily disengaged and removed from the housing of the drive line assembly component.

Figure 1:
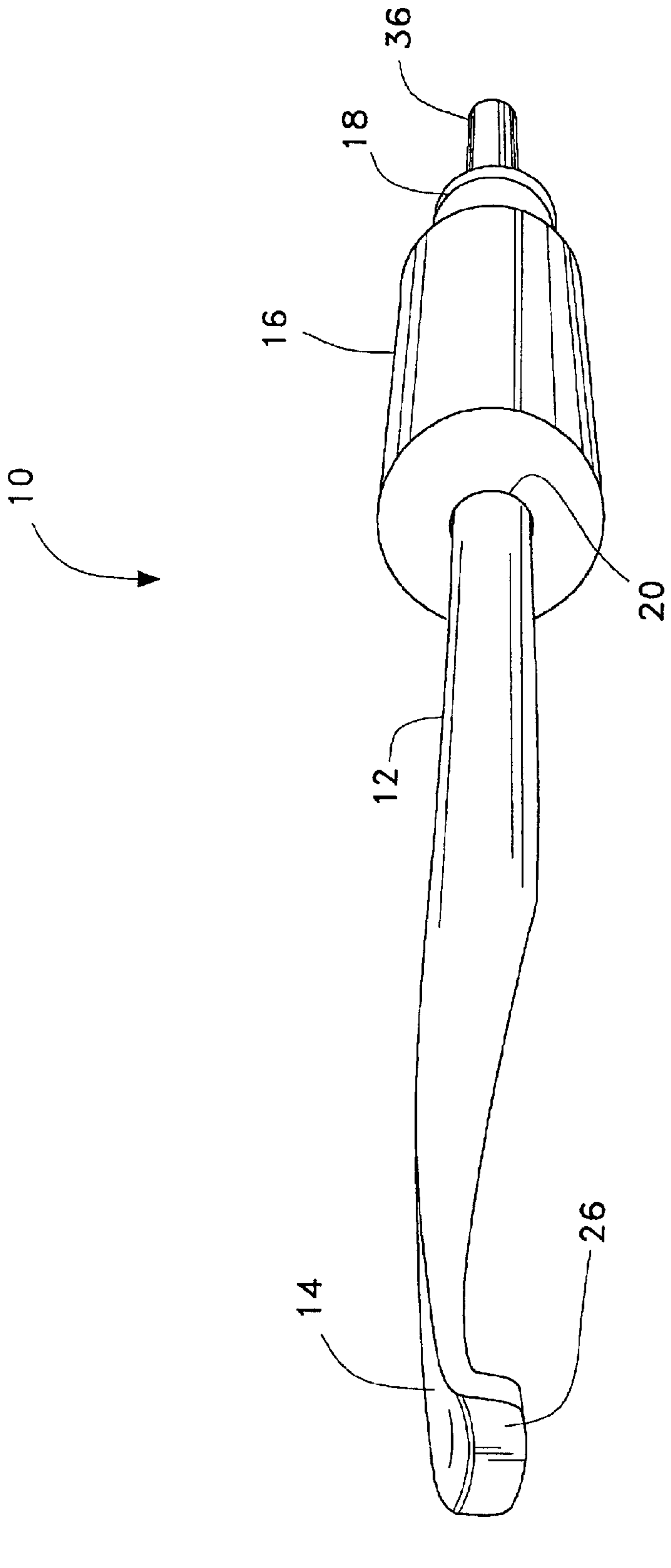
FIG. 1 is a perspective view of an oil seal remover according to the present invention as seen from the seal engaging end.
Figure 2:
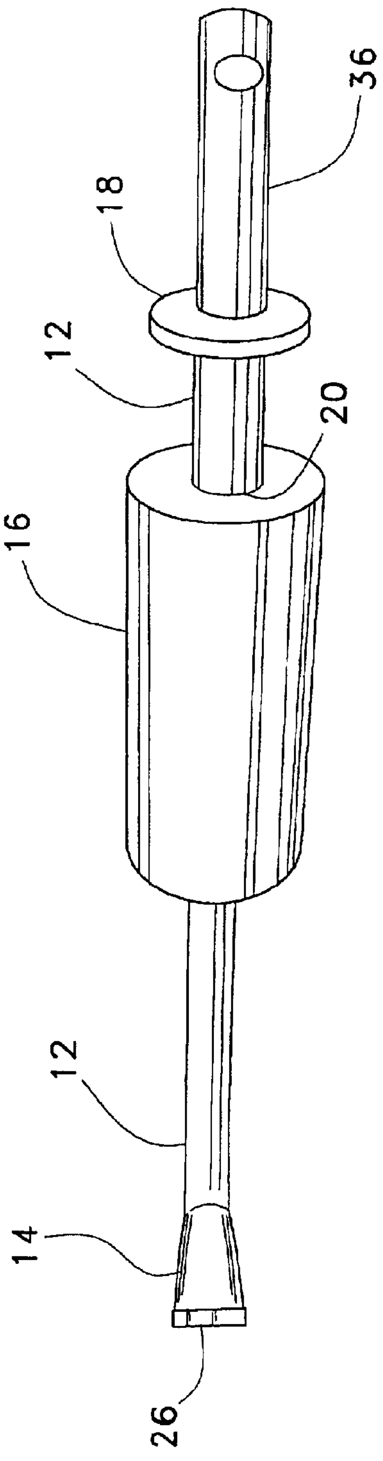
FIG. 2 is a perspective view of the oil seal remover as above as seen from the handle end.
Figure 4B:
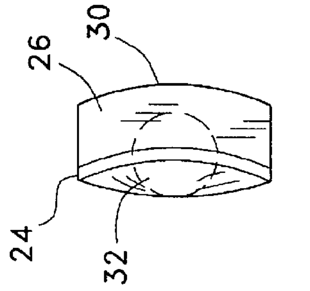
FIG. 4B is an end view of the invention as shown in FIG. 4A

Referring to FIGS. 1 and 2 there are shown perspective views of the inventive sliding hammer seal puller 10. Seal puller 10 comprises a rod 12 having seal engaging end 14 and sliding hammer 16. Sliding hammer 16 is cylindrical in form, slidingly mounted on rod 12 and engages impact collar 18 fixedly mounted on rod 12 so as to receive impacts from sliding hammer 16 when the hammer is slid away from engaging end 14. Sliding hammer 16 has an axial bore 20 for slidingly engaging rod 12. Seal engaging lip 26 is located at the extreme end of seal engaging end 14. Rod 12 terminates in a handle 36 opposite seal engaging end 14.

Figure 3B:
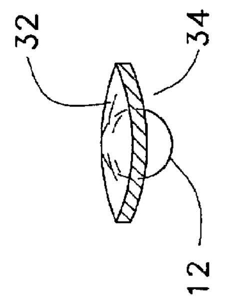
FIG. 3B is a sectional view of the invention of FIG. 3A taken along the lines 3B—3B.
Figure 3A:
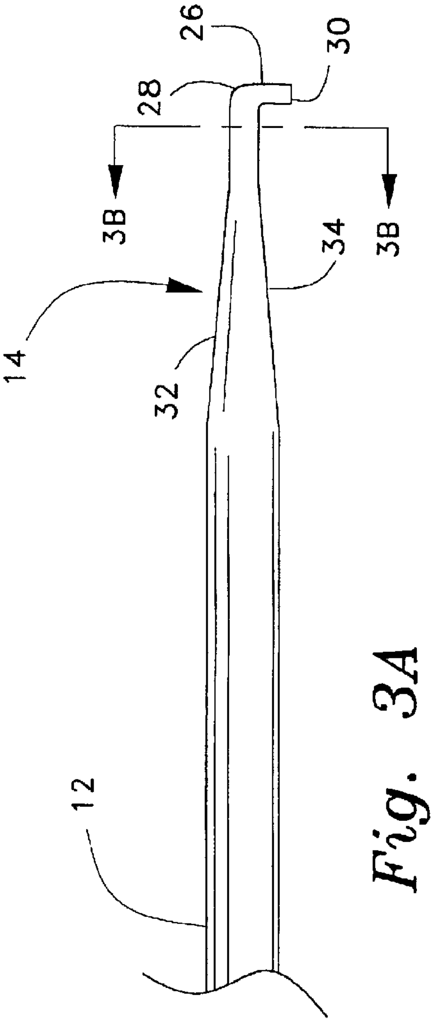
FIG. 3A is a detail side view of the invention of FIG. 1.
Figure 4A:
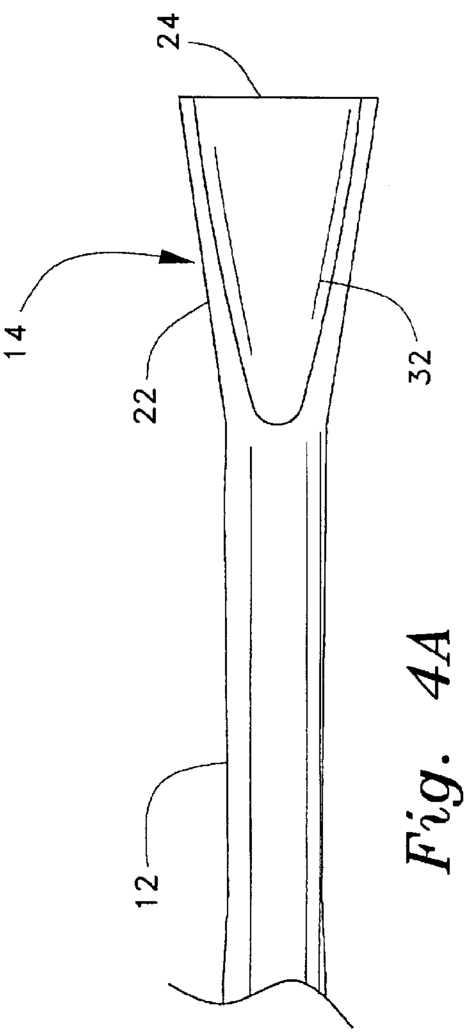
FIG. 4A is a detail plan view of the invention of FIG. 1.
Figure 5:
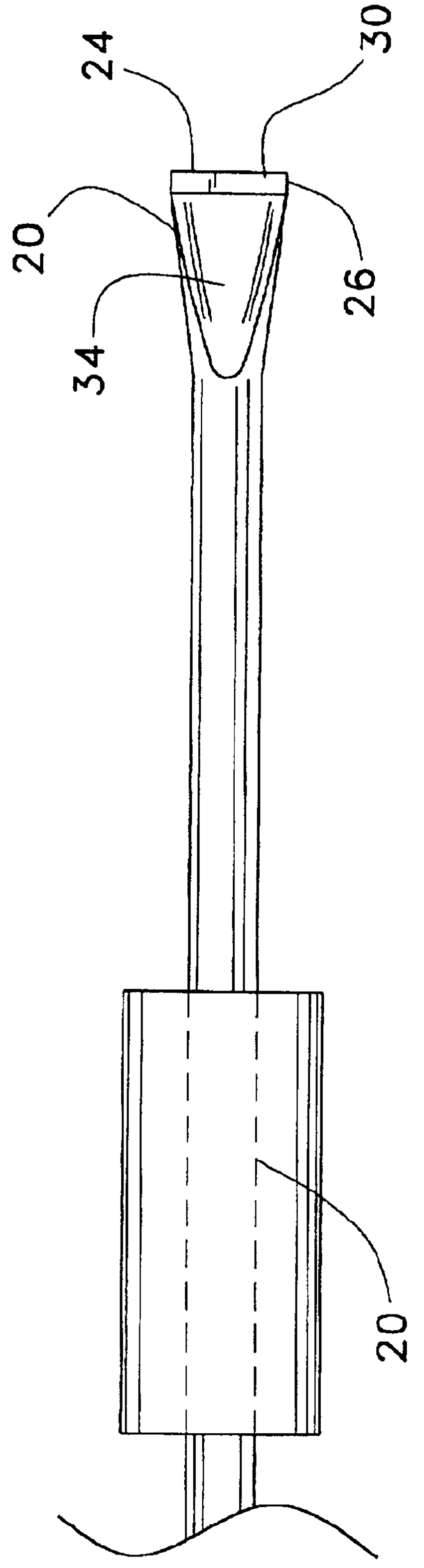
FIG. 5 is a detail bottom view of the invention of FIG. 1.

Referring to FIGS. 3A, 3B, 4A, 4B, and 5, there is shown a detail side view, a sectional view, a plan view, an end view and a bottom view, respectively, of the rod 12 and seal engaging end 14. Seal engaging end 14 comprises a seal engaging end flare portion 22 having a flare portion end 24 from which seal engaging lip 26 extends from ninety degree bend 28. Seal engaging lip 26 ends in free end 30. Flare portion 22 tapers toward seal engaging lip 26 forming seal engaging end upper taper wall 32 and seal engaging end lower taper wall 34. Seal engaging end upper taper wall 32 is concave to match the cylindrical wall of a shaft(not shown) and lower taper wall 36 is correspondingly convex to match the inner wall of a seal(not shown) as shown in FIG. 3A and sectional 3B near seal engaging lip 26 resulting in a curved end 24 in crosswise direction. Seal engaging lip 26 is preferably curved crosswise to conform with the curved end 24 (see FIGS. 4A and 4B). Free end 30 is flat lengthwise but is preferably curved crosswise to match the concave upper taper wall 32.

In operation, flare portion end 24 of flare portion 22 is inserted through the center of a bearing by introducing the end 24 at an angle, squaring rod 12, and moving seal engaging lip over the inner surface of the bearing. The handle 36 is held and sliding hammer 14 is slid along rod 12 until impact with impact collar 18. The impact results in dislodging of the seal from its housing, allowing pulling pressure exerted on rod 12 by the mechanic to remove the seal from its housing.

Flare portion end 24 and seal engaging lip 26 form a flat surface as shown in the figures. The corners of seal engaging lip 26 should by rounded to avoid damaging the seal housing when removing the seal. The rod 12 may be tubular steel in which case the seal engaging end may be formed by pressing opposite sides of rod 12 near its end to form the flare portion. The flare portion end may then be cut at a right angle and the seal engaging lip added. Alternatively, the rod and seal engaging end may be machined and welded up from stock material.

The inventive oil seal puller is preferably constructed of steel, but any other suitable material may be used.

It is to be understood that the present invention is not limited to the embodiment described above, but encompasses any and all embodiments within the scope of the following claims.

I claim:

1. A sliding hammer oil seal remover for pulling an oil seal seated in a housing comprising:

a cylindrical rod having a central axis and a length defined between two ends;

one of said two ends defining a seal engaging end and another one of said two ends defining a handle end;

a cylindrical hammer having an axial bore of such dimension as to slide on said cylindrical rod;

said cylindrical hammer being slidingly mounted on said cylindrical rod and being spaced from said seal engaging end;

a cylindrical impact collar fixedly, and coaxially mounted on said cylindrical rod along the length thereof, and between said seal engaging end and said handle end, said impact collar configured to receive impacts from said cylindrical hammer upon sliding said hammer along said rod in a direction toward said handle end;

said seal engaging end having a flared portion connected with and flaring outward from said rod;

said flared portion having a flared end, wherein said flared portion of said seal engaging end tapers from said cylindrical rod into a generally flattened concave configuration having an upper surface and a lower surface between said rod and said flared portion end; and a seal engaging lip extending from said flared end perpendicular to said flared portion and generally at a right angle to said rod axis;

whereby said handle end is graspable so as to manipulate said seal engaging end to be inserted into an opening of an oil seal, moved laterally, and pulled outward such that said seal engaging lip engages an inner surface of the oil seal; and upon engagement of said seal engaging lip with the inner surface of the oil seal, said hammer is slid along said cylindrical rod in a direction away from said seal engaging end impacting said impact collar with sufficient repetitive force to unseat the oil seal from an oil seal housing, thus removing the seal.

2. The seal remover of claim 1, wherein said seal engaging lip has a concave upper surface extending downward and perpendicular to said concave flared portion end and a corresponding convex lower free end surface at its lower end.

3. The seal remover of claim 2, wherein said seal engaging lip is flat in an axial direction.

4. The seal remover of claim 3, wherein said flare portion end is square relative to said rod axis.

5. The seal remover of claim 1, wherein said handle end of said rod forms a handle for grasping said seal remover.

* * * * *